United States Patent [19]

Simin et al.

[11] Patent Number: 5,054,846
[45] Date of Patent: Oct. 8, 1991

[54] FOLDING GLASS SUNROOF

[75] Inventors: Gerald L. Simin, Holly; Randy L. Carroll, Clarkston, both of Mich.

[73] Assignee: General Motors Corporation, Detroit, Mich.

[21] Appl. No.: 513,411

[22] Filed: Apr. 23, 1990

[51] Int. Cl.$^5$ .............................. B60J 7/11; B60J 7/12; B60J 7/19
[52] U.S. Cl. ................................... 296/218; 296/219; 296/220; 296/224
[58] Field of Search ................ 296/216, 218, 219, 220, 296/224

[56] References Cited

U.S. PATENT DOCUMENTS

| | | | |
|---|---|---|---|
| 3,994,525 | 11/1976 | Brietschwerdt et al. | 296/220 |
| 4,474,405 | 10/1984 | Kloppe et al. | 296/220 |
| 4,723,812 | 2/1988 | Masuda et al. | 296/224 |
| 4,786,102 | 11/1988 | Sakamoto et al. | 296/216 |
| 4,801,174 | 1/1989 | Hirshberg et al. | 296/216 |

FOREIGN PATENT DOCUMENTS

| | | | |
|---|---|---|---|
| 570745 | 12/1957 | Italy | 296/219 |
| 337787 | 11/1930 | United Kingdom | 296/216 |
| 404912 | 1/1934 | United Kingdom | 296/216 |

Primary Examiner—Dennis H. Pedder
Attorney, Agent, or Firm—Raymond I. Bruttomesso, Jr.

[57] ABSTRACT

A motor vehicle with a fixed roof that has a roof opening defining a forward edge, a rear edge, a pair of side edges and a closure for the roof opening. A central hinge hingedly divides the closure panel into a forward panel having a forward edge and an aft edge, and a rear panel having a forward edge and an aft edge. The central hinge permits jackknife folding movement of the panels in relation to each other between an unfolded position closing the roof opening and a folded position. A central handle integral with the central hinge assists the movement of the panels to and from the unfolded position closing the roof opening. A separable hinge hingedly connects the aft edge of the rear panel to the rear edge of the roof opening permitting rotation of the jackknife folded forward and rear panels to a stored position cantilevered rearwardly of the roof opening and overlying the fixed roof. Separation of the separable hinge permits the removal of the panels from the fixed roof. A pair of brackets are mounted on the fixed roof on the side edges of the roof opening. Each bracket has a channel and a slot. A pair of rotatable attachment links, each link interconnect between one of the channels and the forward panel near the forward edge for guiding the panels. The pair of rotatable attachment links are disengagable from the channels to enable removal of the panels.

1 Claim, 4 Drawing Sheets

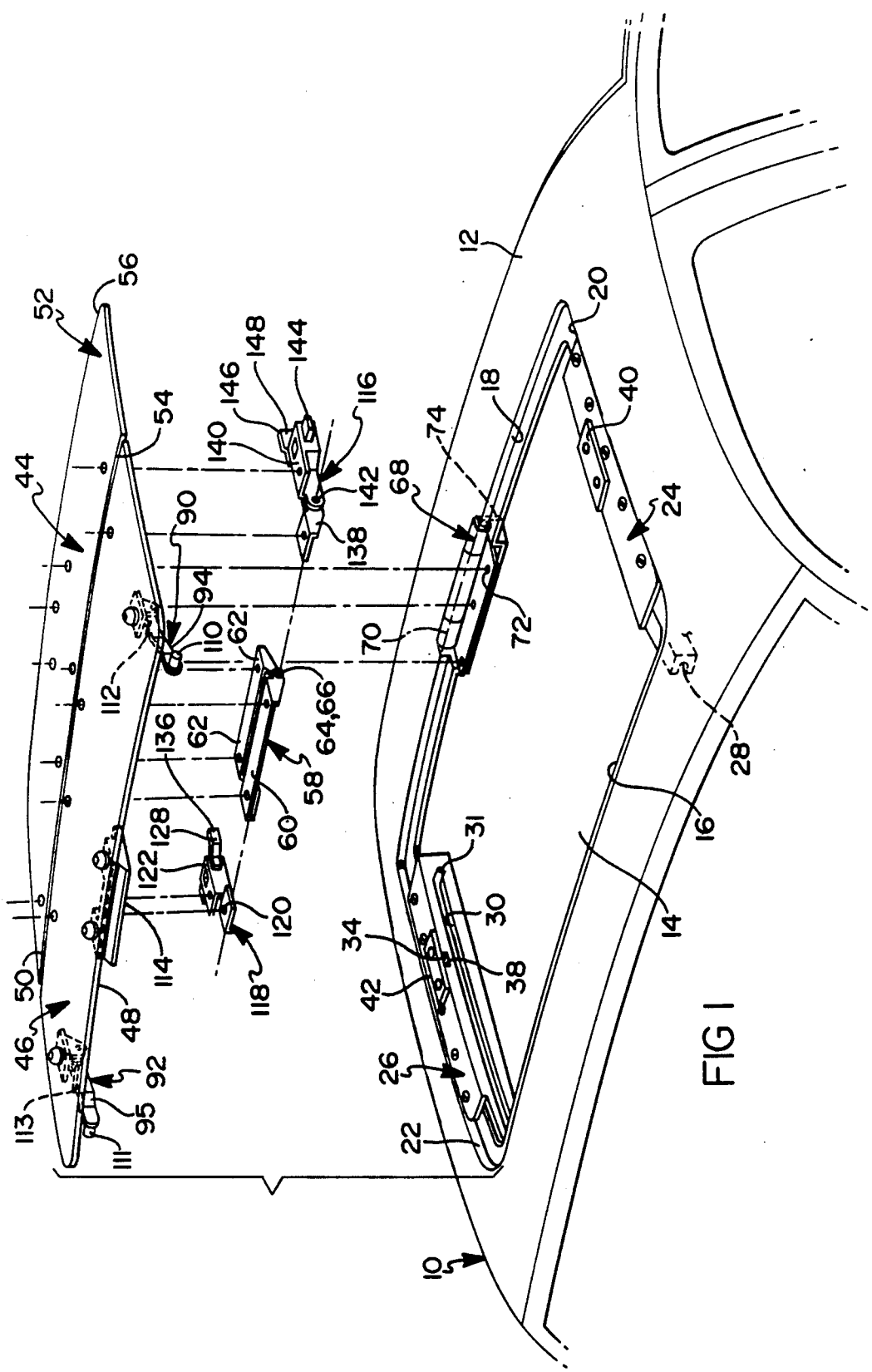

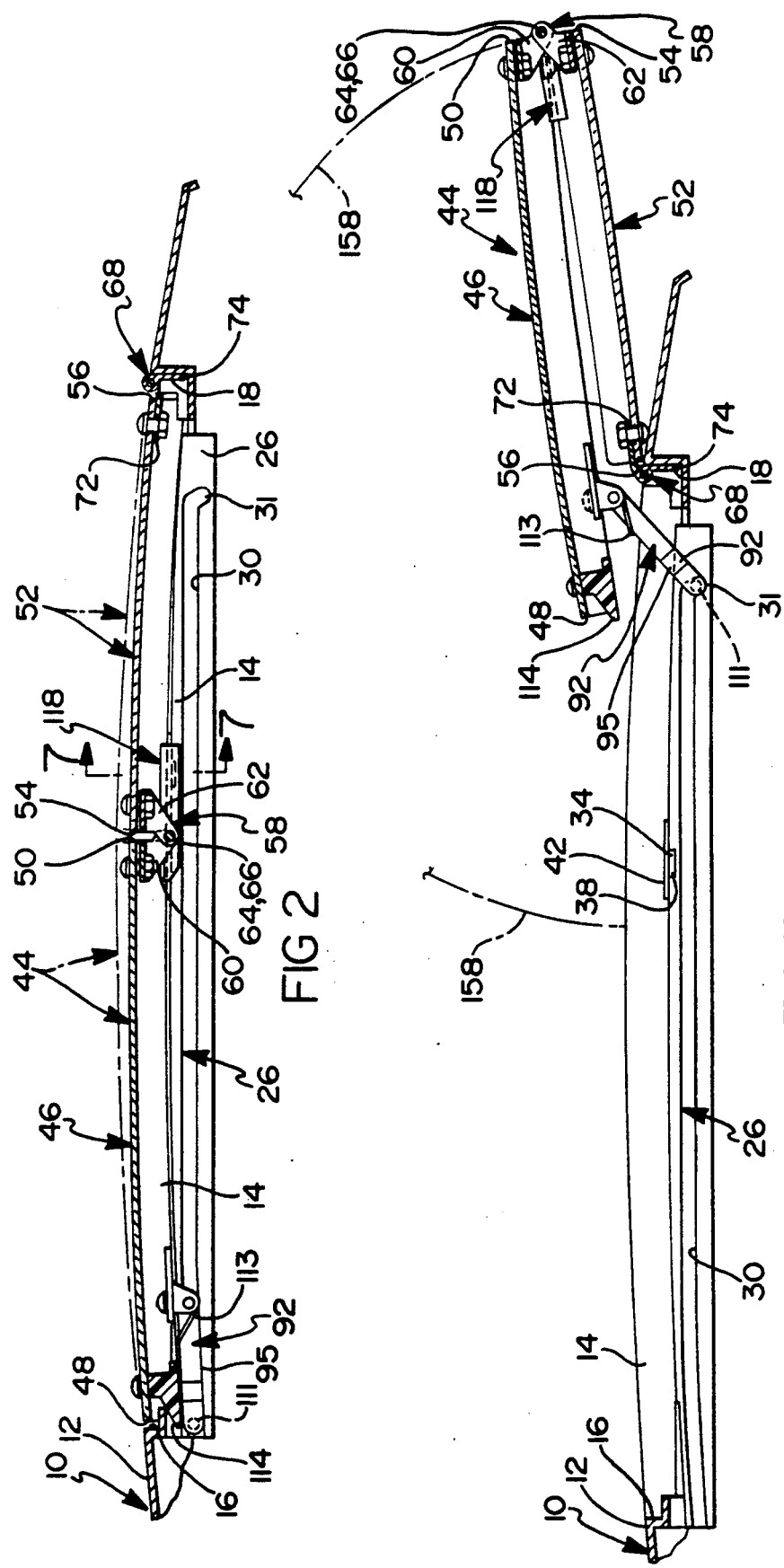

FOLDING GLASS SUNROOF

FIELD OF THE INVENTION

The invention relates to a vehicle sunroof and more particularly a sunroof having two panels hinged together for jackknife folding movement from an unfolded position closing the roof opening to a stored position cantilevered rearwardly behind the roof opening.

BACKGROUND OF THE INVENTION

It is known to have a fixed roof with a roof opening that is covered by a closure panel. The panel can be moved to open the opening by sliding the panel into the roof. It is also known to remove the panel from the fixed roof to open the opening and store the panel elsewhere.

It is also known to have the closure panel composed of two panels which close a roof opening which is greater than fifty percent of the vehicle's roof. U.S. Pat. No. 4,786,102 discloses a closure panel comprised of two panels. The rear panel can be lifted off the vehicle to open the opening. The forward panel can then be moved aft by a linkage and stored above the roof at the rear of the vehicle. Then the rear panel can be attached to the linkages holding the forward panel above the vehicle. Alternatively the rear panel can be stored in the vehicle.

It would be desirable to have a sunroof opening as large as possible, where the occupant could fold up and store the sunroof over the roof without detaching the panels. It would also be desirable to be able to store the whole sunroof in one assembly.

SUMMARY OF THE INVENTION

This invention provides a motor vehicle with a fixed roof having a roof opening defining a forward edge, a rear edge, a pair of side edges and a closure for the roof opening. A central hinge hingedly divides the closure panel into a forward panel having a forward edge and an aft edge, and a rear panel having a forward edge and an aft edge. The central hinge permits jackknife folding movement of the panels in relation to each other between an unfolded position closing the roof opening and a folded position. A central handle integral with the central hinge assists the movement of the panels to and from the unfolded position closing the roof opening. A separable hinge hingedly connects the aft edge of the rear panel to the rear edge of the roof opening permitting rotation of the jackknife folded forward and rear panels to a stored position cantilevered rearwardly of the roof opening and overlying the fixed roof. Separation of the separable hinge permits the removal of the panels from the fixed roof. A pair of brackets are mounted on the fixed roof on the side edges of the roof opening. Each bracket has a channel and a slot. A pair of rotatable attachment links, each link interconnect between one of the channels and the forward panel near the forward edge for guiding the panels. The pair of rotatable attachment links are disengageable from the channels to enable removal of the panels. A pair of hinged latches are located at the junction of the forward edge of the rear panel and the aft edge of the forward panel on the sides of the panel. The hinged latches each have a latch to be received by the slot in the bracket for retaining the panels in the unfolded position covering the roof opening. The latch is positionable above the slot, propped on the bracket, retaining the panels in a partially opened position. A forward wedge handle is mounted on the forward panel for engaging the fixed roof at the forward edge of the roof opening to hold the panels in the unfolded position closing the roof opening. The channels each have a downward inclination for receiving the rotatable attachment links for retaining the panels in the stored position cantilevered rearwardly of the roof opening overlying the fixed roof.

One object, feature and advantage of the invention is the hinged connection of two panels for jackknife folding movement between an unfolded position closing the roof opening and a folded position cantilevered rearwardly of the roof opening and overlying the fixed roof.

Another object, feature and advantage of the invention resides in a downward inclination of the channels near the rear edge of the roof opening for receiving the rotatable attachment links to assist in the retention of the panels when the hingedly connected panels are stored cantilevered rearwardly of the roof opening.

Another object, feature and advantage of the invention resides in the hinged connection of the rear edge of the second panel to the fixed roof by a separable hinge to provide for removal of the panels.

Another object, feature and advantage of the present invention is that when the hingedly connected panels are stored cantilevered rearwardly of the roof opening, the panels are in a stable position nearly horizontal behind the roof opening and any force in the forward direction will not result in the panels sliding towards the unfolded position closing the roof opening.

Further objects, features and advantages of the present invention will become more apparent to those skilled in the art as the nature of the invention is better understood from the accompanying drawings and detailed descriptions.

BRIEF DESCRIPTION OF THE DRAWINGS

FIG. 1 is an exploded perspective view of the sunroof mounted in the roof opening of the vehicle.

FIG. 2 is a sectional view of the sunroof mounted in the roof opening with phantom lines indicating the sunroof panels in the partially opened position.

FIG. 3 is a side sectional view of the sunroof panels in the open position stored behind the opening in the roof.

DESCRIPTION OF THE PREFERRED EMBODIMENT

Figure 4:
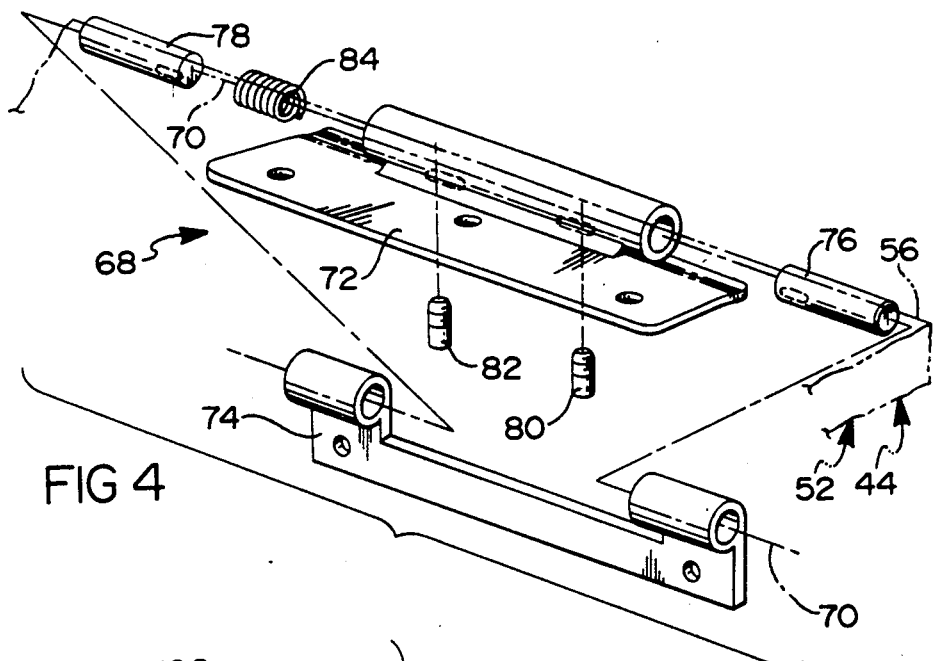
FIG. 4 is perspective exploded view of the separable hinge.

A motor vehicle 10 has a fixed roof 12 that contains a roof opening 14 as shown in FIG. 1. The roof opening 14 has a forward edge 16, a rear edge 18, and two side edges 20 and 22. The fixed roof 12 has a pair of brackets 24 and 26 mounted on the side edges 20 and 22 of the roof opening 14. As seen in FIG. 1, the bracket 26 has a channel 30 and a slot 34 located above the channel 30. The slot 34 is formed in the bracket 26 by a groove 38 covered by a slot cover 42. The channel 30 has a downward inclination 31 near the rear edge 18 of the roof opening 14. The other bracket 24 is constructed identical to bracket 26, and has a channel 28, a slot concealed beneath a slot cover 40, and a downward inclination which is not seen.

The roof opening 14 is covered by a closure panel 44 divided into a forward panel 46 having a forward edge 48 and an aft edge 50 and a rear panel 52 having a forward edge 54 and an aft edge 56 as seen in FIG. 1. A central handle hinge 58 connects the two panels 46 and 52.

The central handle hinge 58 has a forward hinge half 60 connected to the aft edge 50 of the forward panel 46 and a rear hinge half 62 connected to the forward edge 54 of the rear panel 52. A pin 64 pivotally connects the hinge halves 60 and 62 allowing the panels 46 and 52 to fold in jackknife motion against each other. The pin 64 acts also as a handle 66 which can be pushed or pulled to assist in movement of the panels 46 and 52 in a vertical direction.

A separable hinge 68 pivotally attaches the aft edge 56 of the rear panel 52 to the fixed roof 12 at the rear edge 18 of the roof opening 14 as shown in FIG. 1. The separable hinge 68 has a hinge axis 70 wherein the hinge 68 separates allowing an upper hinge half 72 to remain with the rear panel 52 and a lower hinge half 74 to remain fixed to the fixed roof 12. FIG. 4 shows a pair of lock bolts 76 and 78 interconnect the upper hinge half 72 and the lower hinge half 74 and disengage from the upper hinge half 72 when a pair of lock releases 80 and 82 which are connected to the lock bolts 76 and 78 are pulled inboard. A spring 84 forces the lock bolts 76 and 78 back to the extended position when the lock releases 80 and 82 are released.

Figure 5:
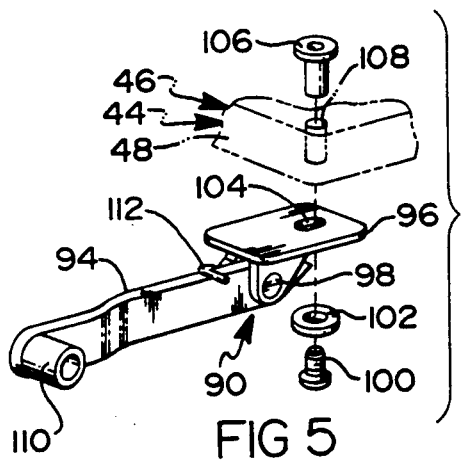
FIG. 5 is a perspective exploded view of the rotatable attachment link connected to the panel.

The forward panel 46 is guided upon the vehicle 10 by a pair of rotatable attachment links 90 and 92 provided respectively on the corners near the forward edge 48 of the forward panel 46 as shown in FIG. 1. As shown in FIG. 5, the rotatable attachment link 90 includes a link 94 pivotably mounted on a bracket 96 by a pin 98. A screw 100 extends through a washer 102 and a hole 104 in the bracket 96 and is threaded into a nut 106 seated in a hole 108 in the forward panel 44. A guide 110 is mounted on the end of the link 94 and slideably seats within the channel 28 of the bracket 24 so that the forward end 48 of the forward panel 46 is guideably linked to the bracket 24 mounted on the fixed roof 12 for fore and aft slideably guided movement along the channel 28. A spring 112 encircles the pin 98 and acts to bias the guide 110 of the rotatably attachment link 90 downward with respect to the forward panel 46. The other rotatable attachment link 92 is similarly constructed including a link 95, a guide 111, and a spring 113 as seen in FIG. 1.

A forward wedge handle 114 as shown in FIG. 1 is mounted near the forward edge 48 of the forward panel 46 and is used to move the panels 46 and 52. The forward wedge handle 114 also wedges under the fixed roof 12 at the forward edge 16 of the roof opening 14 as shown in FIG. 2 to assist in retaining the panels 46 and 52 in the closed position.

Figure 6:
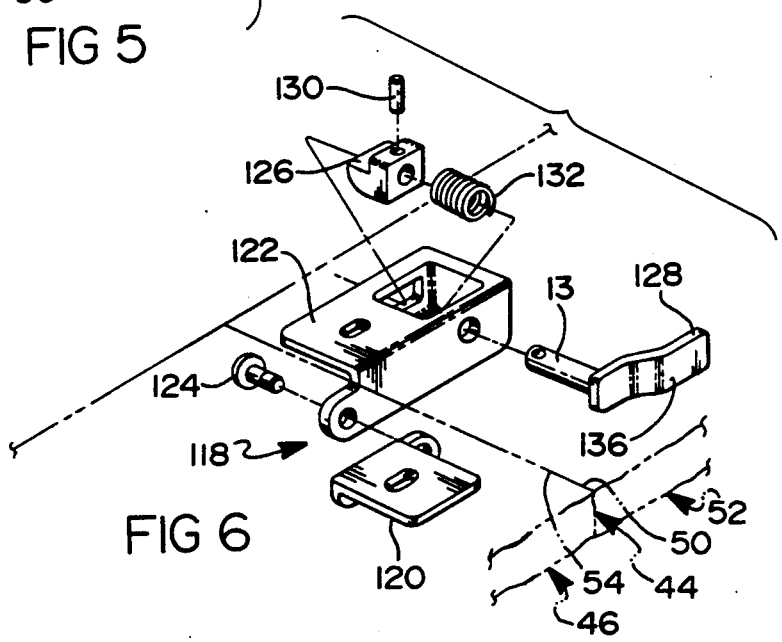
FIG. 6 is a perspective exploded view of the hinge latch.
Figure 7:
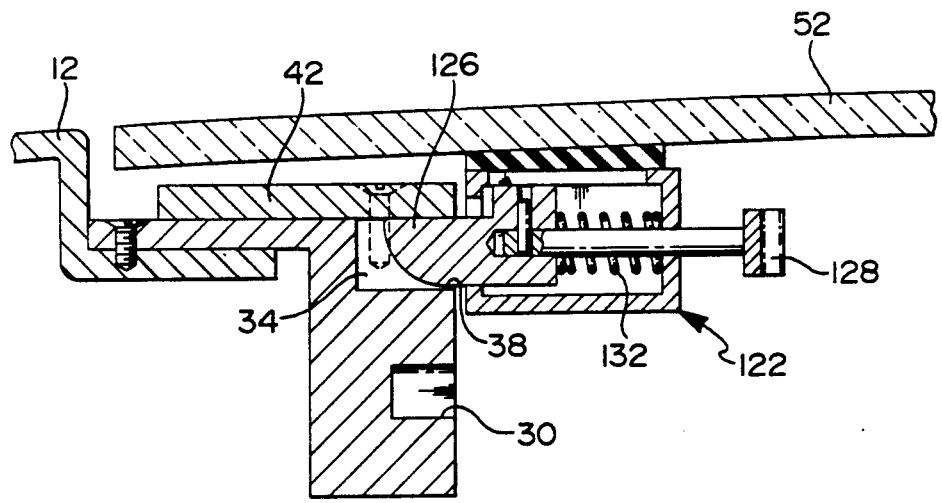
FIG. 7 is a sectional view generally taken in the direction of arrows 7—7 of FIG. 2 of the hinged latch when the sunroof panels are in the closed position.

A pair of hinged latches 116 and 118 as shown in FIG. 1 pivotally connect the forward panel 46 and rear panel 52 together in addition to the central handle hinge 58. As shown in FIG. 6, the hinged latch 118 includes a forward hinged half 120, and a rear hinged half 122 pivotally connected by a rivet or pin 124. The rear hinged half 122 has a latch 126 connected to a release handle 128 by a connecting pin 130 with a spring 132 surrounding an arm portion 134 of the release handle 128. The spring 132 biases the latch 126 to the extended position where it engages with the slot 34 formed in the bracket 26 on the fixed roof 12. The latch 126 is released by movement of a handle portion 136 of the release handle 128 inboard thus pulling the latch 126 inboard. The spring 132 resets the latch 126 to the extended position when the release handle 128 is released. The other hinged latch 116 is similarly constructed with a forward hinge half 138, and a rear hinge half 140 pivotally connected by a rivet or pin 142. As shown in FIGS. 1 and 7, the other hinged latch 116 also has a latch 144 and a release handle 146 with a handle portion 148 and a spring, not seen.

The panels 46 and 52 have a curvature to conform with the curvature of the fixed roof 12 which results in the sides being lower than the center. Therefore though the hinged latches 116 and 118 and the rotatable attachment links 90 and 92 are attached to the same surface as the central handle hinge 58 and the forward wedge handle 114, they are shown on a lower vertical plane in FIGS. 2 and 3.

A weatherstrip seal, not shown, is located on the fixed roof 12 near the forward edge 16, the rear edge 18 and the two side edges 20 and 22 of the roof opening 14. A bulb seal, not shown, is mounted on the aft edge 50 of the forward panel 44 to seal against the forward edge 54 of the rear panel 52. These seals prevent moisture from entering the vehicle 10 when the panels are in unfolded position closing the roof opening 14.

OPERATION OF THE PANELS

The panels 46 and 52 can be placed in several positions depending on the desired effect. FIG. 2 shows the panels 46 and 52 in the unfolded position closing the roof opening 14. Referring to FIG. 7, the panels 46 and 52 are latched in this closed position by the latches 126 and 144 of the hinged latches 116 and 118 being retained by the slots 34, only one shown, in the brackets 24 and 26 holding the panels 46 and 52 against the fixed roof 12. The forward wedge handle 114 also holds the forward edge 48 of the forward panel 46 against the fixed roof 12 by the forward wedge handle 114 being received by the fixed roof 12 near the forward edge 16 of the roof opening 14 by a friction fit.

The phantom lines in FIG. 2 show the panels 46 and 52 in the partially opened ventilation position. The panels 46 and 52 are placed in the ventilation position by the latches 126 and 144 of the hinged latches 116 and 118 being released from the slots 34, only one shown, in the brackets 24 and 26 by pulling the release handles 128 and 148 inboard. The handle 66 of the central handle hinge 58 is pushed upward slightly. The forward wedge handle 114 moves aft from the forward edge 16 of the roof opening 14, however it remains in contact with the fixed roof 12. The forward panel 46 cants with the aft edge 50 of the panel 46 projecting upward, since the wedge handle 114 is still in contact with the fixed roof 12. The rear panel 52 cants in the other direction since the forward edge 54 is hinged to the forward panel 46 and the aft edge 56 is hinged to the fixed roof 12 and rotates about the hinged axis 70. The panels 46 and 52 are not in contact with the brackets of the fixed roof 12 and a gap is formed between the panels and along the forward edge of the forward panel and the aft edge of the rear panel partly opening the roof opening to provide ventilation.

Figure 8:
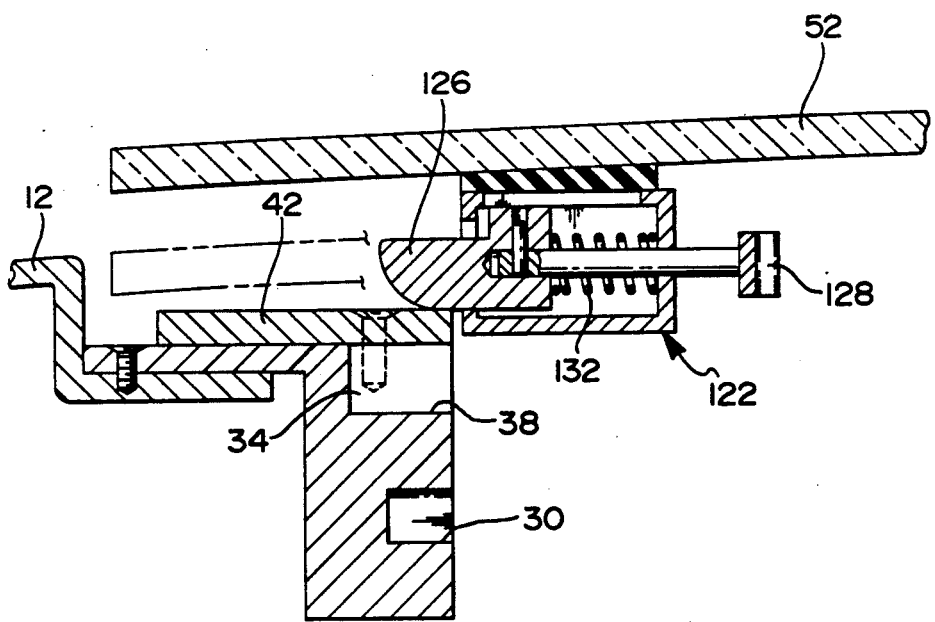
FIG. 8 is a sectional view similar to that of FIG. 7 but of the hinged latch when the sunroof panels are in the partially opened position.

Referring to FIG. 8, the latches 126 and 144 of the hinged latches 116 and 118 are propped upon the slot covers 40 and 42 of the brackets 24 and 26 so that the panels 46 and 52 are in this partially opened position.

FIG. 3 shows the panels 46 and 52 in the folded position and cantilevered aft of the roof opening 14 to store the panels 46 and 52. To arrive at this position from the unfolded position closing the roof opening 14 shown in FIG. 2 and 7, first the latches 126 and 144 of the hinged latches 116 and 118 are released from the slots 34, only one shown, in the brackets 24 and 26 by pulling the release handles 126 and 146 inboard. The central handle hinge 58 is pushed upward slightly causing the forward wedge handle 114 to move aft from the forward edge 16 of the roof opening 14. The forward wedge handle 114 moves aft disengaging the friction fit with the fixed roof 12 at the forward edge 16 of the roof opening 14. Continue by pushing the forward wedge handle 114 rearward causes the panels 46 and 52 to fold in jackknife motion about the pin 64 of the central handle hinge 58 and the pins 124 and 142 in the hinged latches 116 and 118. The guides 110 and 111 of the rotatable attachment links 90 and 92 follow the channels 28 and 30 in the brackets 24 and 26 and guide the forward portion of the forward panel 46. The aft edge 56 of the rear panel 52 pivots about the hinge axis 70 of the separable hinge 68. The pin 64 of the central handle hinge 58 follows a curve path 158 getting higher above the the fixed roof 12 until it is above the hinge axis 70 of the separable hinge 68. The panels 46 and 52 continue to fold upon each other as the central handle hinge 58 and the hinge latches 116 and 118 descend to a position over the fixed roof 12 behind the roof opening 14. At the same time the rotatable attachment links 90 and 92 follow the channels 28 and 30 in the brackets 24 and 26 until the guides 110 and 111 reach the downward inclination 31, which assist in holding the panels 46 and 52 in the stored position cantilevered rearwardly of the roof opening 14 and overlying the fixed roof 12. The panels in this folded position, stored cantilevered rearwardly of the roof opening, the panels are in a stable position nearly horizontal behind the roof opening and any force in the forward direction will not result in the panels sliding towards the unfolded position closing the roof opening.

The panels 46 and 52 can be returned to the unfolded position closing the roof opening 14 as shown in FIG. 2. The aft edge 50 of the forward panel 46 and the forward edge 54 of the rear panel 52 are lifted upward and forward to move the panels 46 and 52 out of the stable position nearly horizontal behind the roof opening 14. The forward wedge handle 114 is moved upward and forward causing the guides 110 and 111 to withdraw from the downward inclination. The pin 64 of the central handle hinge 58 follows the curve path 158 in reverse of path followed on opening. The forward wedge handle 114 is pushed forward until the panels 46 and 52 are in the partially opened position shown in FIG. 2 in phantom. The handle 66 of the central handle hinge 58 is pulled downward causing the latches 126 and 144 of the hinge latches 116 and 118 to move inboard as the latches slide by the slot covers 40 and 42 and the springs 132, only one shown, force the latches 126 and 144 into the slots 34, only one shown, holding the panels 4 and 52 in the unfolded position.

The panels 46 and 52 can be removed from the fixed roof 12 in one unit for storage. The panels 46 and 52 are first placed in the stored position of FIG. 3 cantilevered aft of the roof opening 14. The links 94 and 95 of the rotatable attachment links 90 and 92, which are made of spring steel, are pushed inboard to remove the guides 110 and 111 from the channels 28 and 30 in the brackets 24 and 26. The lock releases 80 and 82 of the separable hinge 68 are pulled inboard towards each other, thereby disengaging the upper hinge half 72 from the lower hinge half 74. The forward panel 46 and the rear panel 52 are then lifted from the fixed roof 12 and may be stored away from the fixed roof 12.

To reinstall the panels 46 and 52, the lock releases 80 and 82 of the separable hinge 68 are pulled inboard so that the upper hinge half 72 can be aligned with the lower hinge half 74. When the lock releases 80 and 82 are released the lock bolts 76 and 78 are forced outboard by the spring 84 to interlock the hinge halves 72 and 74. The links 94 and 95 are pushed inboard to allow the guides 110 and 111 to enter the channels 28 and 30 of the the brackets 24 and 26 on the fixed roof 12.

While one embodiment of the present invention has been explained, various modifications within the spirit and scope of the following claims will be readily apparent to those skilled in the art.

The embodiments of the invention in which an exclusive property or privilege is claimed are defined as follows:

1. A motor vehicle with a fixed roof having a roof opening defining a forward edge; a rear edge and a pair of side edges and a closure panel for the roof opening comprising:

a central hinge hingedly dividing the closure panel into a forward panel having a forward edge and an aft edge, and a rear panel having a forward edge and an aft edge and permitting jackknife folding movement of the panels in relation to each other between an unfolded position closing the roof opening and a folded position;

a central handle integral with the central hinge for assisting the moving of the panel to and from the unfolded position closing the roof opening;

a separable hinge hingedly connecting an aft edge of the rear panel and the rear edge of the roof opening permitting rotation of the jackknife folded forward and rearward panels to a stored position cantilevered rearwardly of the roof opening and overlying the fixed roof, and separation of the separable hinge permitting the removal of the panels;

a pair of brackets mounted on the fixed roof on the side edges of the roof opening, each bracket having a channel and a slot above the channel;

a pair of slot covers, each slot cover covering a slot for limiting egress from the slot;

a pair of rotatable attachment links, each link interconnected between one of the channels and the forward panel near the forward edge for guiding the panels, the pair of rotatable attachment links disengageable from the channels to enable removal of the panels;

a pair of hinge latches located at the junction of the forward edge of the rear panel and the aft edge of the forward panel on the sides of the panel, the hinge latches each having a latch engageable within the slot in the bracket covered by the slot cover for retaining the panels in the unfolded position covering the roof opening, and the latch being positionable above the slot and propped on the slot cover establishing the panels in a partially open position;

a front wedge handle mounted on the forward panel for engaging the fixed roof at the forward edge of the roof opening to hold the panels in the unfolded position closing the roof; and the channels each having a downward inclination for receiving the rotatable attachment links for retaining the panels in a stored position cantilevered rearwardly of the roof opening and overlying the fixed roof.

* * * * *